UNITED STATES PATENT OFFICE.

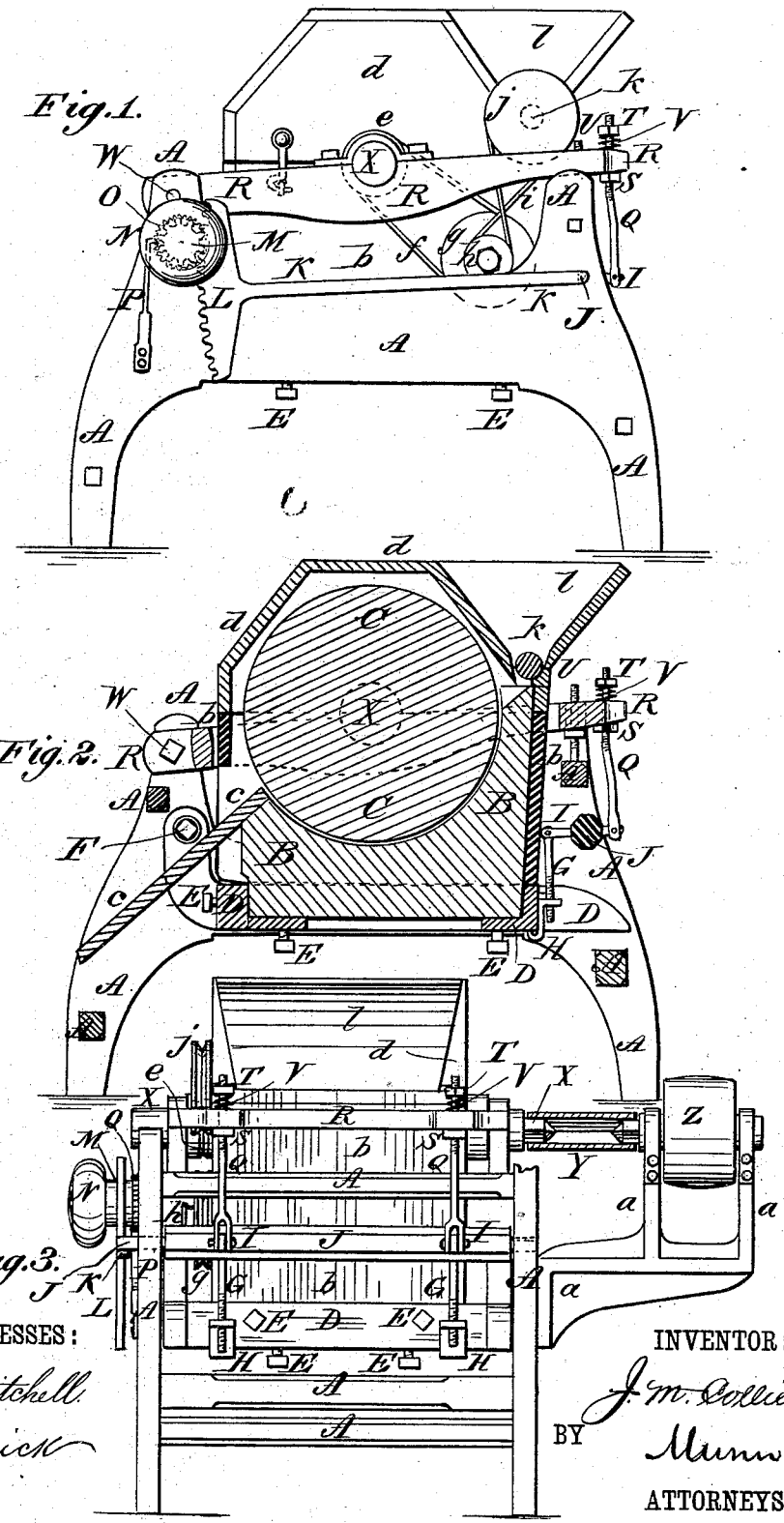

JAMES M. COLLIER, OF GADSDEN, ALABAMA.

GRINDING-MILL.

SPECIFICATION forming part of Letters Patent No. 257,658, dated May 9, 1882.

Application filed September 13, 1881. (No model.)

*To all whom it may concern:*

Be it known that I, J. M. COLLIER, of Gadsden, in the county of Etowah and State of Alabama, have invented a new and useful Improvement in Grinding-Mills, of which the following is a full, clear, and exact specification.

Reference is to be had to the accompanying drawings, forming part of this specification, in which similar letters of reference indicate corresponding parts in all the figures.

Figure 1 is a side elevation of my improvement. Fig. 2 is a sectional side elevation of the same. Fig. 3 is a rear elevation of the same, partly in section.

The object of this invention is to facilitate the grinding of grain and other substances and promote convenience in adjusting and dressing the stones.

A represents the frame of the mill. B is the lower or stationary stone, and C is the upper stone or runner. The runner C is made cylindrical, and the stationary stone B is concaved upon its upper side to receive and fit upon the runner C, and has its rear part extended upward farther than its forward part, as shown in Fig. 2. The lower stone, B, rests upon the rack or frame D, and is adjusted and held by set-screws E passing through the said rack and resting against the front, back, and bottom of the said stone. The forward ends of the side bars of the rack D are curved upward, and are hinged to the side parts of the frame A by screws or bolts F, so that the edge of the forward part of the stone B will not strike against the face of the runner C when the rear end of the rack D is released from its supporting-rods. The rear ends of the side bars of the rack D project to serve as handles and to rest upon the rear cross-bar of the frame A when the rear end of the said rack D is released from its supporting-rods G. The lower ends of the rods G have screw-threads cut upon them, and pass through screw-holes in the shanks of the hooks H, which hook upon the lower side of the rear cross-bar of the rack D, as shown in Figs. 2 and 3. The upper ends of the rods G are hinged to the inner ends of the cross-bars I, which pass through the shaft J, and are secured at their middle parts to the said shaft J. The ends of the shaft J, or journals formed upon or attached to the said ends, work in bearings in the rear part of the frame A, and to one of the said ends is attached the rear end of a lever, K, which extends forward along the side of the frame A, and has a cross-head rack, L, attached to its forward end. The forward edge of the rack L is curved upon the arc of a circle having its center at the axis of the shaft J, and its teeth mesh into the teeth of a gear-wheel, M, journaled to the side of the forward part of the frame A.

To the gear-wheel M is attached a hand-wheel, knob, or other handle, N, for convenience in turning it.

To the gear-wheel M is also attached, or upon it is formed, a ratchet-wheel, O, with the teeth of which engages the spring-pawl P, attached to the frame A, to hold the said gear-wheel M in any position into which it may be turned. With this construction, by turning gear-wheel M in one or the other direction the lower stone, B, can be raised or lowered to adjust it closer to or farther from the runner C, according as the grain is required to be ground finer or coarser.

To the outer ends of the cross-bars I are hinged the lower ends of the rods Q, the upper parts of which pass up through holes in the rear cross-bar of the rack R, and have screw-threads formed upon them to receive the nuts S T. The nuts S are placed below the cross-bar of the rack R, and the nuts T are placed above the said cross-bar, as shown in Figs. 1, 2, and 3. With this construction the racks R and D will be moved at the same time toward or from each other by turning the shaft J.

To the upper rear cross-bar of the frame A are attached two studs or stationary bolts, U, which pass up through short slots in the rear cross-bar of the rack R, and have screw-threads formed upon their upper ends. With this construction, by disengaging the hooks H from the rack D only the upper rack, R, will be moved by turning the shaft J, and by removing the nuts S T from the rods Q and placing them upon the studs U only the rack D will be moved by turning the shaft J, so that the two racks can be moved together, or either separately, in adjusting the stones, as may be desired.

V are spiral springs placed upon the rods Q between the cross-bar of the rack R and the nuts T to allow the upper rack, R, to rise should a hard substance get between the stones. The forward ends of the side bars of the rack R are hinged to the forward upper corners of the frame A by screws or bolts W, or other suitable means.

To the middle parts of the side bars of the rack R are attached bearings for shaft X, to which the upper stone or runner, C, is attached. With this construction, by taking off the nuts T the rack R and runner C can be turned over forward, giving convenient access to the face of the stationary stone B. One of the ends of the shaft X projects, and is squared to receive the end of the coupling-sleeve Y, the other end of which receives the squared end of a journal of the pulley Z, so that the mill will be unaffected by the pull of the driving-belt. The journals of the pulley Z revolve in bearings in a bracket, stand, or other support, a, which in the drawings is represented as being attached to the frame A, but which I prefer to attach to the floor, so as to be entirely separate from the said frame A, to still further guard the mill against the pull of the driving-belt.

I have described the running-stone shaft and the driving-pulley shaft as being connected by a coupling-sleeve; but the connection can be made by a shaft having a clutch at each end to engage with corresponding clutches on the ends of the runner and pulley shafts, or by any other suitable connection that will cause the said runner-shaft to be revolved by the said pulley-shaft while keeping the runner from being affected by the pull of the driving-belt.

The lower stone, B, is surrounded by a casing, b, which has an opening in front for the escape of the chop, which slides down an inclined spout or apron, c, into some suitable receiver. The inclined apron c is attached to the frame A, with its upper end at the opening between the stones C B.

The upper stone, C, is inclosed by a casing or cover, d, the lower edge of which rests upon the upper edge of the lower casing, b, and which is secured in place upon the said casing b by dowel-pins and hooks or other suitable means.

Upon the journal of the shaft X is formed, or to it is attached, a pulley, e, around which passes a belt, f. The belt f also passes around a large pulley, g, pivoted to the case b or to some other suitable support. With the pulley g is rigidly connected a small pulley, h, around which passes a belt, i. The belt i also passes around a large pulley, j, attached to the end of the shaft k, which revolves in the lower parts of the ends of the hopper l, attached to the cover or casing d, and serves as a feed-roller to feed the grain in uniform quantities to the grinding-stones. The hopper l is attached to the cover d in such a position as to discharge the grain into the space between the stones B C at the top of the rear part of the stationary stone B, as shown in Fig. 2. With this construction the stones can be readily adjusted to grind the grain coarser or finer and access can be had readily to the faces of the stones. It will also be observed that the stones separate and the grain is fed to them at the rear side, and that in adjusting the stones the rear part of the opening between the stones is mostly affected, the forward parts of the stones, where the grinding is finished, changing their relative positions but very little.

Having thus fully described my invention, I claim as new and desire to secure by Letters Patent—

1. The combination of the frame A, the stationary concave stone B, the cylindrical runner C, and the hinged supporting-racks D R, as set forth.

2. In a grinding-mill, the combination, with frame A and the stationary stone B, of the hinged rack D, the connecting-rods G, the cross-bars I, the rock-shaft J, and mechanism for turning said shaft, substantially as herein shown and described, whereby the said stone can be adjusted by turning the said shaft, as set forth.

3. In a grinding-mill, the combination, with the frame A and the cylindrical runner C, of the hinged rack R, the connecting-rods Q, the cross-bars I, and the rock-shaft J, and mechanism for turning said shaft, substantially as herein shown and described, whereby the said runner can be adjusted by turning the said shaft, as set forth.

4. In a grinding-mill, the combination, with the frame A and the racks D R, that carry the grinding-stones, of the connecting-rods G and Q, the cross-bars I, and the rock-shaft J, and mechanism for turning said shaft, substantially as herein shown and described, whereby both stones can be adjusted by one operation, as set forth.

5. In a grinding-mill, the combination, with the rack D, carrying the stationary stone B, and the connecting-rods G, of the hook-nuts H, substantially as herein shown and described, whereby the said connecting-rods can be readily detached from the said rack, as set forth.

6. In a grinding-mill, the combination, with the rock-shaft J, carrying the cross-bars I, connecting-rods G Q, and the racks D R, of the lever K, rack-segment L, gear-wheel M, and ratchet and pawl O P, substantially as herein shown and described, whereby the said shaft can be readily turned to adjust the stones and will be securely held when adjusted, as set forth.

JAMES MADISON COLLIER.

Witnesses:
JOHN McVEY,
C. R. GASKILL.